United States Patent
Thomsen et al.

(10) Patent No.: US 10,560,549 B1
(45) Date of Patent: Feb. 11, 2020

(54) CONFIGURATION UPDATES OF DISTRIBUTED APPLICATIONS

(71) Applicant: Uber Technologies, Inc., San Francisco, CA (US)

(72) Inventors: Jakob Holdgaard Thomsen, Risskov (DK); Anders Bach Madsen, Skødstrup (DK); Rene Wenzel Schmidt, Risskov (DK); Lasse Knud Damgaard, Aarhus (DK); Joakim Recht, Aarhus (DK); Jeppe Welling Hansen, Aarhus (DK)

(73) Assignee: Uber Technologies, Inc., San Francisco, CA (US)

( * ) Notice: Subject to any disclaimer, the term of this patent is extended or adjusted under 35 U.S.C. 154(b) by 86 days.

(21) Appl. No.: 15/403,960

(22) Filed: Jan. 11, 2017

Related U.S. Application Data

(60) Provisional application No. 62/277,900, filed on Jan. 12, 2016.

(51) Int. Cl.
*H04L 29/08* (2006.01)

(52) U.S. Cl.
CPC ............. *H04L 67/34* (2013.01); *H04L 67/02* (2013.01); *H04L 67/10* (2013.01)

(58) Field of Classification Search
CPC .......... H04L 67/34; H04L 67/02; H04L 67/10
USPC ........................................ 709/221, 222, 228
See application file for complete search history.

(56) References Cited

U.S. PATENT DOCUMENTS

| | | | | |
|---|---|---|---|---|
| 6,598,057 B1* | 7/2003 | Synnestvedt | ........... | H04L 29/06 |
| 7,606,889 B1* | 10/2009 | Kundala | ............. | H04L 41/0866 709/220 |
| 8,799,418 B2* | 8/2014 | Rider | .................. | G06F 9/44505 709/203 |
| 8,819,561 B2* | 8/2014 | Gupta | ..................... | H04L 41/22 709/224 |
| 2003/0009540 A1* | 1/2003 | Benfield | ............. | H04L 41/0213 709/220 |
| 2003/0233385 A1* | 12/2003 | Srinivasa | ................ | G06F 9/466 718/1 |
| 2005/0264581 A1* | 12/2005 | Patrick | ................ | H04L 65/4076 345/594 |
| 2009/0040947 A1* | 2/2009 | Krivopaltsev | ...... | H04L 41/0213 370/255 |
| 2011/0138366 A1* | 6/2011 | Wintergerst | ........ | G06F 11/3409 717/130 |
| 2012/0005243 A1* | 1/2012 | Van der Merwe | .... | H04L 41/145 707/812 |

(Continued)

*Primary Examiner* — Michael Won
(74) *Attorney, Agent, or Firm* — Fenwick & West LLP

(57) ABSTRACT

A configuration deployment system stores configuration settings for a plurality of applications disposed at one or more computing hosts. The configuration settings are stored in a versioned repository and are organized in a hierarchical namespace structure. To deploy the configuration settings, a deployment service monitors the configuration settings at the configuration repository and identifies when a new configuration setting or a new version of an existing configuration setting is available in the configuration repository. The new configuration setting is transmitted to a computing device for use in an application. The application applies the changed configuration setting upon verifying that the change is compatible with the application.

14 Claims, 6 Drawing Sheets

(56) References Cited

U.S. PATENT DOCUMENTS

| | | | | |
|---|---|---|---|---|
| 2012/0110142 A1* | 5/2012 | Montagna | ............... | G06F 8/71 |
| | | | | 709/220 |
| 2012/0173958 A1* | 7/2012 | Kulathu | ............... | H04L 67/125 |
| | | | | 715/221 |
| 2013/0247032 A1* | 9/2013 | Bhargava | ............ | G06F 11/3006 |
| | | | | 718/1 |
| 2014/0075031 A1* | 3/2014 | Doering | ............. | H04L 41/5041 |
| | | | | 709/226 |
| 2014/0089264 A1* | 3/2014 | Talagala | ............. | G06F 11/1471 |
| | | | | 707/649 |
| 2015/0212893 A1* | 7/2015 | Pawar | .................. | G06F 16/128 |
| | | | | 707/649 |
| 2015/0350015 A1* | 12/2015 | Clemm | .............. | H04L 41/0813 |
| | | | | 709/221 |
| 2015/0381711 A1* | 12/2015 | Singh | ................ | H04L 41/0813 |
| | | | | 709/221 |
| 2017/0192853 A1* | 7/2017 | Alberti | ............... | G06F 11/1451 |
| 2017/0317882 A1* | 11/2017 | Bitincka | ............... | H04L 67/06 |
| 2018/0004503 A1* | 1/2018 | OlmstedThompson | .. | G06F 8/65 |
| 2018/0219976 A1* | 8/2018 | Decenzo | ................ | H04L 67/10 |
| 2019/0073270 A1* | 3/2019 | Venkatesan | ......... | G06F 11/1451 |

\* cited by examiner

CONFIGURATION UPDATES OF DISTRIBUTED APPLICATIONS

CROSS-REFERENCE TO RELATED APPLICATIONS

This application claims the benefit of Provisional Application 62/277,900, filed Jan. 12, 2016, which is incorporated by reference herein in its entirety.

BACKGROUND

1. Field of Art

The present disclosure generally relates to the field of distributed systems, and more specifically to providing configuration updates to distributed applications.

2. Background of the Disclosure

In a distributed system, applications executing on distributed endpoints may be managed by a central server. These applications often need to be configured initially and on an on-going basis. In typical implementations, a configuration change requires the server to update the entire application, thus requiring a user of the endpoint to download and install the updated application with every configuration change. This process is not only cumbersome for the user, but results in many endpoints continuing to operate applications that are outdated.

SUMMARY

A configuration deployment system stores configuration settings for a plurality of applications disposed at one or more computing hosts. The configuration deployment system provides an interface for configuration administrators to view and set configuration settings for the applications. When a configuration setting is received, the configuration setting is stored in a configuration repository as a file associated with a version. To deploy the configuration settings, a deployment service monitors the configuration settings at the configuration repository and identifies when a new configuration setting or a new version of an existing configuration setting is available in the configuration repository. The new configuration setting is transmitted to a computing device for use in an application on the computing device.

The computing device may verify that the configuration attributes (e.g., a constant, a whitelist of clients, tunable parameter, etc.) is valid for the application. The application can apply the configuration setting without resetting the application itself. After the configuration setting is applied to the application, the performance of the application is monitored to determine whether there are any changes. If the performance changes are detrimental, the configuration change can be rolled back to a prior version from the configuration repository or a snapshot of the prior configuration setting. According to examples, the configuration deployment system enables an administrator to change configuration settings or parameters to a running system without system downtime (e.g., applications do not need to be restarted).

DETAILED DESCRIPTION

The figures depict various embodiments of the present invention for purposes of illustration only. One skilled in the art will readily recognize from the following discussion that alternative embodiments of the structures and methods illustrated herein may be employed without departing from the principles of the invention described herein.

According to examples herein, a configuration deployment system stores configuration settings for a plurality of applications disposed at one or more computing hosts. The configuration deployment system provides an interface for configuration administrators to view and set configuration settings for the applications. When a configuration setting is received, the configuration setting is stored in a configuration repository as a file associated with a version. To deploy the configuration settings, a deployment service monitors the configuration settings at the configuration repository and identifies when a new configuration setting or a new version of an existing configuration setting is available in the configuration repository. The new configuration setting is transmitted to a computing device for use in an application on the computing device. The computing device may verify that the configuration attributes (e.g., a constant, a whitelist of clients, tunable parameter, etc.) is valid for the application. In some examples, the application can apply the configuration setting without resetting the application itself. After the configuration setting is applied to the application, the performance of the application is monitored to determine whether the changes are beneficial or detrimental to the application. If the performance changes are detrimental, the configuration change can be rolled back to a prior version from the configuration repository or a snapshot of the prior configuration setting. According to examples, the configuration deployment system enables an administrator to change configuration settings or parameters to a running system without system downtime (e.g., applications do not need to be restarted).

Figure 1:
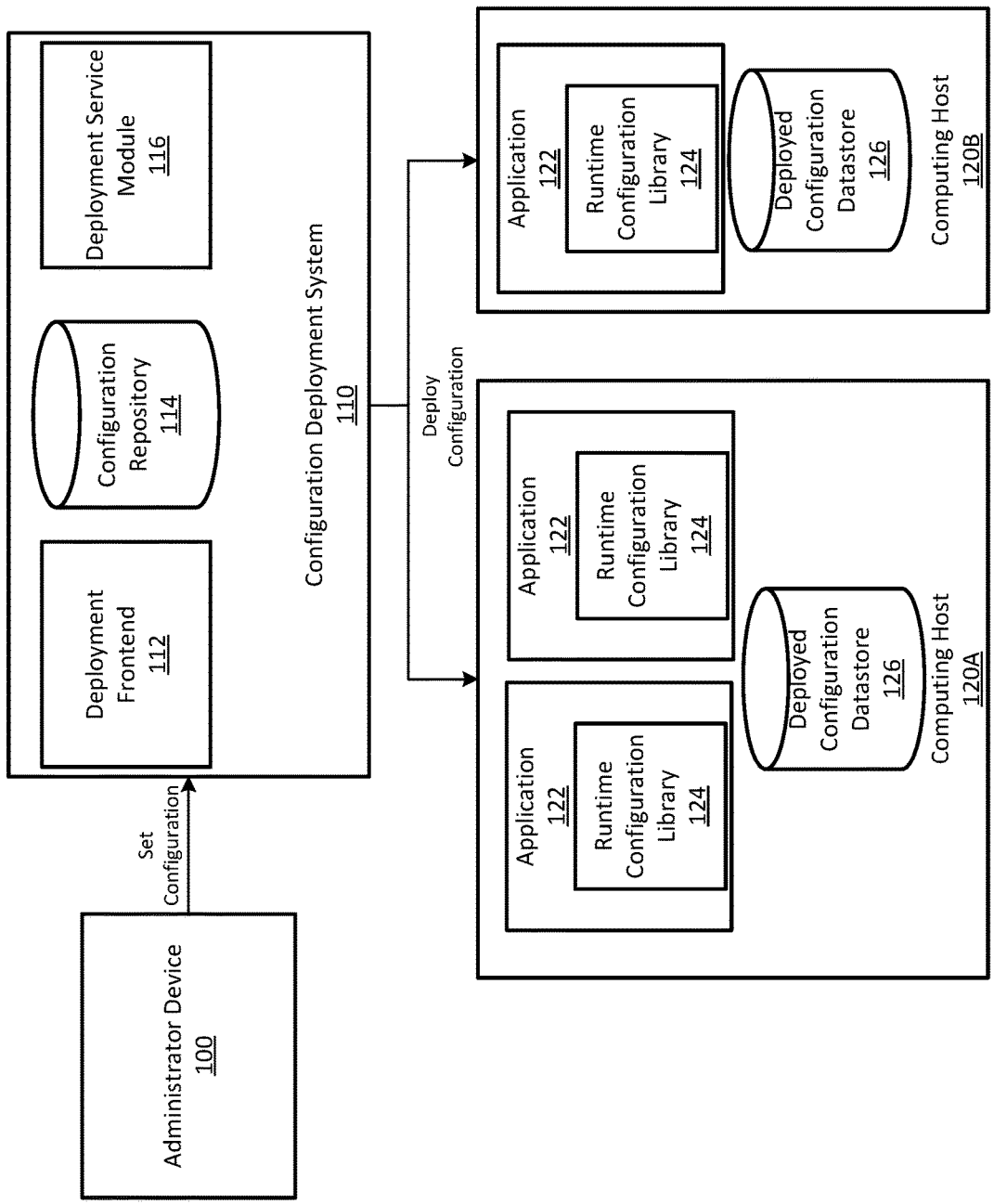
FIG. 1 illustrates an example environment for deploying configuration settings to applications on computing hosts, according to one embodiment.

FIG. 1 illustrates an example environment for deploying configuration settings to applications on computing hosts, according to one embodiment. A configuration deployment system 110 maintains configuration settings for applications 122 executing on one or more computing hosts 120. The configuration settings may be provided by an administrator device 100 that provides the configuration settings at the configuration deployment system 110. These configuration settings are stored in a configuration repository 114 at the configuration deployment system 110 and deployed from the configuration deployment system 110 to the computing hosts 120. These various components communicate with one another via a network (not shown) that may comprise any combination of technologies for communicating between various computing systems.

Each computing host 120 may execute one or more applications with configuration settings associated with the configuration deployment system 110. The computing hosts 120 may be computing resources or servers provided by a cloud computing provider or another system provider. Two computing hosts 120 are shown here, though the number of computing hosts 120 in the environment may be in the hundreds, thousands, or more, or as few as one. Applications 122 executing on the computing hosts 120 may provide database support and computing services for other user devices or other types of applications. For example, the application 122 in one embodiment is an on-demand trip coordination system that manages coordination between drivers and passengers of trips, and may be responsible for managing trip information, routing users, managing trip payment, and so forth. Example configuration settings for such an on-demand trip coordination system include a provider selection radius for a city, blacklist for users or emails, data center redirect information, length of time for a timeout, and so forth. These various settings may impact the performance of the application 122. As shown by FIG. 1, each computing host may execute one or more applications 122 associated with the configuration deployment system 110. Each application 122 may differ from one another, or may be separate instances of the same application 122. In this example, computing host 120A executes two applications 122, and computing host 120B executes one application 122.

Configuration settings for an application 122 on the computing host 120 are stored in a deployed configuration datastore 126. When the application 122 retrieves a configuration setting during its normal operation, it may access the deployed configuration datastore 126 for the attributes corresponding to the configuration setting.

To update and monitor the configuration settings, a runtime configuration library 124 is associated with each application 122. Though termed a library herein, the functionality of runtime configuration library 124 may be particularly configured for each application, and in other examples may comprise a portion of the application's normal programming. The runtime configuration library 124 includes a set of features and/or functions to retrieve (or receive, in other examples) configuration settings from the configuration deployment system 110, verify that the configuration settings are operable in the application 122, insert or include the configuration settings into the operation of the application 122, and store the updated configuration settings to the deployed configuration datastore 126. In some examples, the runtime configuration library 124 may also monitor the performance of the application 122 and report the performance to the configuration deployment system 110.

In one embodiment, the runtime configuration library 124 requests configuration updates from the configuration deployment system 110 to determine whether a change in configuration settings has occurred. In an alternative embodiment, the configuration deployment system 110 notifies the runtime configuration library 124 associated with a given application 122 that an update is available. The runtime configuration library 124 requests the configuration update from the configuration deployment system 110 (e.g., the deployment service module 116, as discussed further below). The runtime configuration library 124 identifies any new configuration settings in the configuration updates and before applying the new configuration settings verifies whether the configuration settings are valid for the application (e.g., the application can continue to run). In one example, the application 122 may include a function for execution by the runtime configuration library 124 to validate the updated configuration settings. The validation may confirm, for example, that the configuration setting is of a type that is appropriate for the application 122, that the setting is not out of range, and so forth. In one embodiment, the runtime configuration library 124 validates the updated configuration settings by applying the settings to the application 122 and subsequently monitoring the operation of the application to determine whether the settings cause any detrimental effect on the operation.

When the configuration setting is not valid, the runtime configuration library 124 does not apply the configuration to the application 122. Since the new configuration setting (that was not valid) is not applied, the application 122 can continue to execute with the prior operating attributes of the configuration setting, even if the configuration setting at the configuration deployment system 110 is invalid. In one embodiment, the runtime configuration library 124 notifies the configuration deployment system 110 that the configuration setting is not valid and/or was not applied to the application 122. When the configuration setting is valid, the runtime configuration library 124 stores the configuration setting to the deployed configuration datastore 126 and applies the updated configuration setting to the application 122. In one embodiment, the runtime configuration library 124 applies the configuration setting to the application 122 by updating an object in the application 122 associated with the configuration setting. The updated object reflects the new attribute and any event handlers in the application 122 that reference the configuration setting may be restarted or notified that the attribute has changed.

The runtime configuration library 124 may also report data to the configuration deployment system 110 relating to performance and operation of the application 122. This data may provide, for example, diagnostic information relating to various events that occur in the application 122, and may be one means for an administrator to determine whether a changed setting is effective subsequent to the configuration setting being applied to the application 122. The runtime configuration library 124 may provide an application programming interface for the configuration deployment system 110 to request the performance and operation data of the application 122. The runtime configuration library 124 may monitor event handlers to collect the type and frequency of events that occur for an application 122 and report this event data to the configuration deployment system 110.

The configuration deployment system 110 includes a deployment frontend 112, a configuration repository 114, and a deployment service module 116. The configuration repository 114 maintains configuration settings in a file repository 114. The deployment frontend 112 provides a user interface to an administrator operating the administrator device 100. The user interface enabled the administrator to view and change configuration settings stored in the configuration repository 114.

The configuration repository 114 stores the configuration settings as files in a versioned repository. Each configuration setting may be individually stored as a separate file and may be stored as a "flat" file, such that the contents of the file include only the configuration setting with metadata about the file. In another example, the configuration settings may be organized into one or more namespaces, reflecting configuration settings for a particular deployment of the configuration settings. The configuration settings for a namespace may be stored together as a versioned file. The configuration settings for a namespace may be stored as a markup language, such as XML, YAML, or similar. The configuration repository 114 may implement user-permissions to control access and modification of the configuration settings, to prevent unauthorized modifications of the configuration settings.

Each configuration setting is also versioned, such that each change of the configuration setting is associated with a different version. A version is also associated with metadata describing the circumstances of the version, such as its author (who made the change), the time the change was made, and other values. The configuration repository 114 may also provide analysis of different versions of configuration settings, for example, by identifying changes between two different versions of a configuration (e.g., a "diff"). In one embodiment, the configuration repository is a git repository, though other file versioning and control systems may also be used.

As noted above, the configuration settings may be associated with namespaces. Each namespace identifies a particular configuration, from which to select a value of a configuration setting. For example, a configuration setting relating to a provider selection radius in a city may differ for two different cites, each of which is associated with a separate namespace. As another example, the namespaces may be used to distinguish between values used for development of an application and for production (e.g., in-service) versions of the application.

A configuration setting stored in the configuration repository is associated with a field and a set of attributes. In one example embodiment, the field denotes a name of the configuration setting, and the attributes include a type, a default value, one or more values, an update mode, and/or a description. The name specifies the name of the setting, which may mirror the name of the setting as used in the application 122. The type is used to specify the range and type of values that the configuration setting may hold. For example, the type may specify an integer, floating point, a set, or a more complex value, such as specified by a schema or other organization of values. The default value specifies the value for the configuration setting in the absence of the user-defined value (e.g., the one or more values) or if the user-defined value is inoperable. The one or more values specify the current value of the configuration setting, which must be consistent with the type. The update mode describes the method of updating the value, and may indicate how the value is used to update the data in the application 122, for example, whether it is overwritten or merged to a prior value. The description provides a description of the configuration setting to be used in displaying the configuration setting to the administrator.

A configuration setting may also be associated with one or more namespaces. Each namespace may have a set of values for that namespace. The namespaces may also be hierarchical, such that when a value is undefined for a namespace, the value can be inherited from a parent namespace. The namespace that does not inherit any configuration settings from another namespace is termed the "base namespace."

Figure 2:
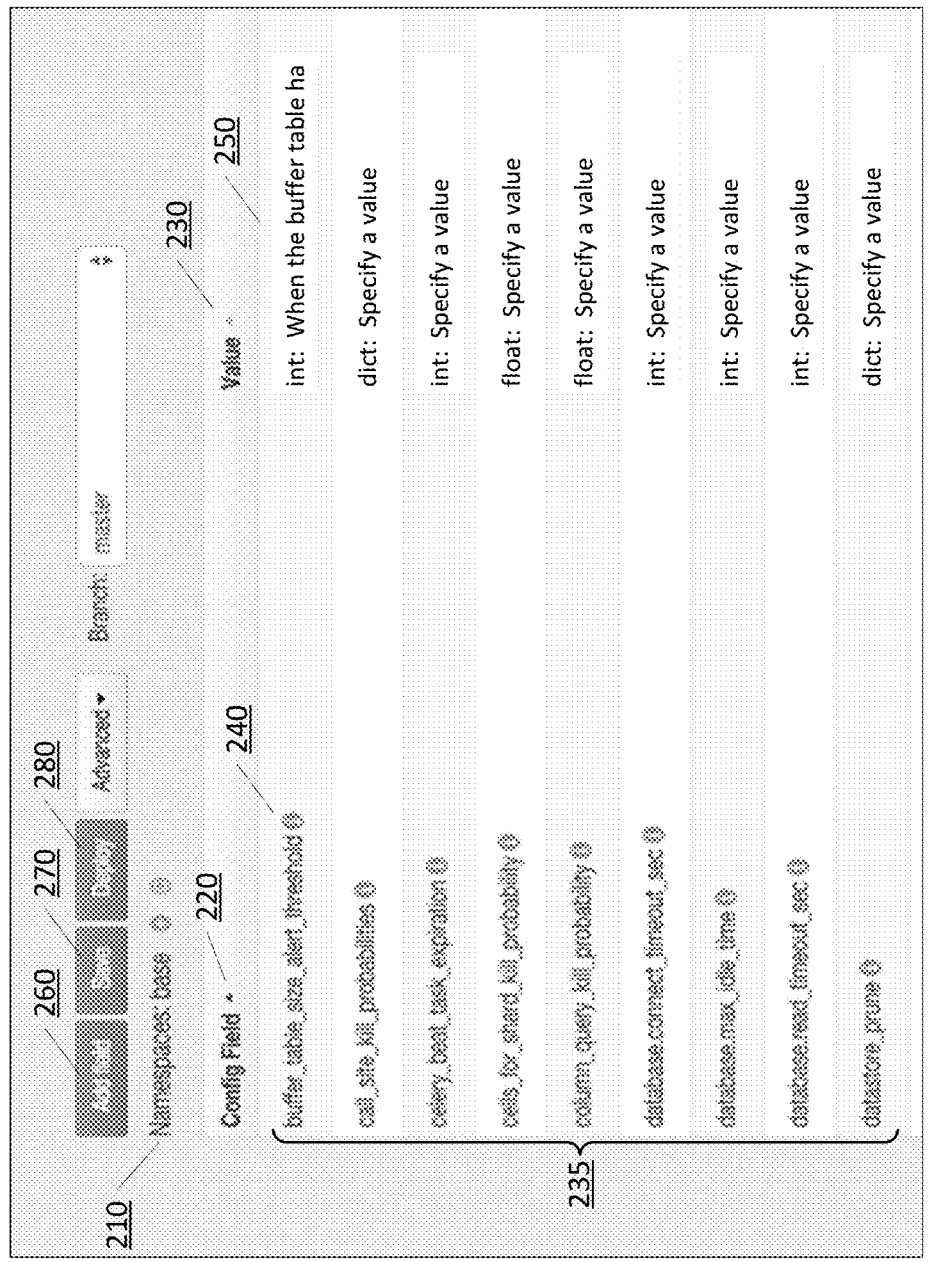
FIG. 2 illustrates an example user interface for an administrator to set configuration settings of the configuration deployment system.

FIG. 2 illustrates an example user interface 200 for an administrator to set configuration settings of the configuration deployment system 110. The user interface 200 is provided to the administrator device 100, for example, for display on a web browser using HTTP, for display to the administrator. As the administrator interacts with the user interface 200, the administrator may view configuration settings, change values of the configuration settings, and set namespaces for the configuration settings. A namespace interface element 210 displays the current namespace that the administrator is viewing. Initially, the administrator may view the base (or top-level) namespace, from which all other namespaces inherit default values. The administrator may interact with the namespace interface element 210 to select or add another namespace to the configuration repository 114. For a selected namespace, the user interface 200 also displays the configuration field 220 and the value 230 for various a set of configuration settings 235.

For each configuration setting, the name 240 of the configuration setting is shown, along with a value interface element 250. The value interface element 250 may initially display the description of the value, and alternatively may display the current value of the interface. If the value has not been set or inherits the value from another namespace, that may also be indicated in the value 250. The user may interact with the value field to set a new value of the configuration setting. In addition, the user may view additional details for the value, such as set values for other namespaces, the prior values for the configuration setting (based on prior versions of the value in the repository), or the default value.

The user may also interact with the user interface 200 to add a field to the configuration settings, for example by interacting with the add field interface 260. The added field may be added as a field for the selected namespace 210, or added to the base namespace and then inherited by the selected namespace. When a user adds the field, an interface can be displayed to the user to request information about the newly-added field, the user may specify a name, description, default value, type, and so forth for the newly-added field.

The user interface may also include a save interface element 270, to store the configuration values, and a deploy interface element 280 to deploy the changes to related applications. In one embodiment, a single interface saves and deploys the change in configuration settings. When a user saves the displayed configuration settings, the frontend interface 112 updates the files associated with the configuration settings and commits the files to the configuration repository 114, for example as a new version of the files. When the user selects the deploy interface element 280 to deploy the changes, the settings may be committed to the configuration repository 114 (if not already done so) and the deployment frontend 112 notifies the deployment service module 116 that the configuration settings were updated. In one embodiment, the deployment service module 116 is updated whenever new configuration settings are committed to the configuration repository 114.

To commit the configuration changes, the deployment frontend 112 may also modify the files for the configuration changes based on the changes. For example, when a field is removed, the field may be removed from all namespaces in the repository, and when a field is added its default value may be added to the base namespace along with the new field.

Though not shown in the user interface 200, in some example, users may also modify configuration settings by other means, such as by manually modifying and committing changes to the configuration repository 114.

Referring back to FIG. 1, when a change to configuration settings is committed to the configuration repository 114, the deployment service module 116 deploys the configuration settings to the various applications 122. To deploy the configuration settings, the deployment service module 116 may determine a snapshot of configuration values for the namespaces affected by the configuration change. The snapshot of configuration values may include each value from the configuration repository for a snapshot, incorporating any parent namespaces, such that the snapshot includes the set of configuration values for each namespace. The snapshot may also exclude certain information from the attributes of a configuration setting, such as the description or the default value. When a new snapshot is created, the snapshot may be given a version to distinguish the version of the snapshot from prior snapshots for a namespace.

After generating the snapshot, the deployment service module 116 may identify and notify applications 122 associated with the namespaces. In other embodiments, the deployment service module 116 receives a request from the runtime configuration library 124 to confirm the configuration settings version, and the configuration update may be initiated from the runtime configuration library request. When the versions differ between the runtime configuration library 124 and the snapshot, the runtime configuration library 124 requests the new snapshot. The deployment service module 116 provides the version of the snapshot to the requesting runtime configuration library 124 based on a namespace associated with the requesting application 122.

As discussed above, the runtime configuration library 124 verifies the changed configuration settings before applying the configuration settings, and can provide verification to the deployment service module 116 and monitoring of the application after applying configuration settings. The deployment service module 116 receives the verification and monitoring, and determines whether there were any errors or other problems with the configuration settings. When the runtime configuration library 124 reports that the application 122 was not verified (e.g., the settings are not compatible with the application), the deployment service module 116 may suspend providing the snapshot to other applications, and notify the administrator device 100 of the erroneous configuration setting. To monitor the new application setting, the deployment service module 116 can establish a baseline of events for the application 122 as the runtime configuration library 124 reports events of the application 122. After a configuration settings change, the deployment service module 116 determines whether the event baseline significantly deviates from the baseline.

In some embodiments, the configuration service module 116 deploys the configuration change to a subset of the applications for the namespace prior to deploying the configuration change to all applications. The configuration service module 116 can confirm that the setting was successfully validated for the subset and monitor the performance of the subset of applications before providing the configuration settings change to the remaining applications.

Figure 3:
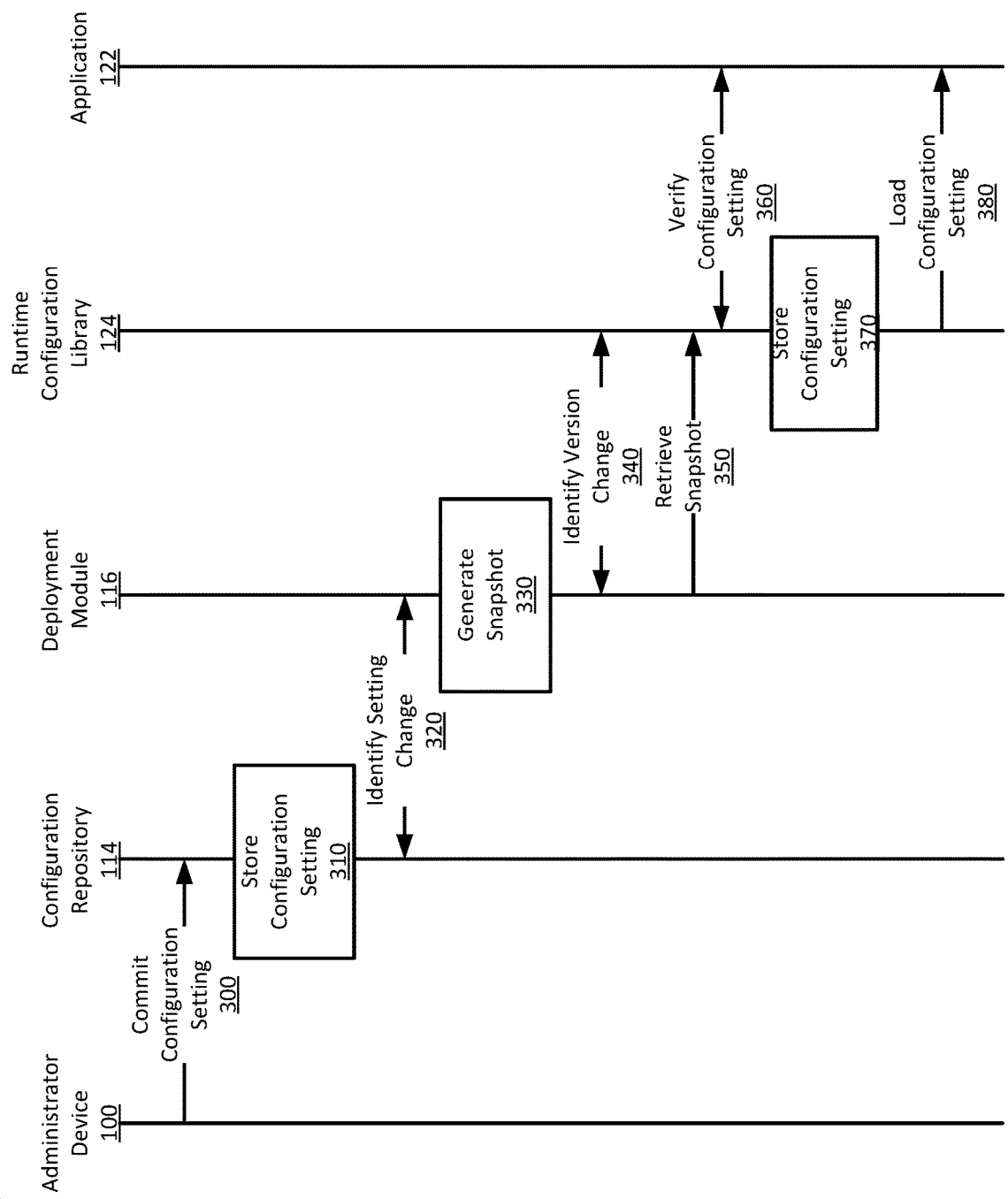
FIG. 3 illustrates an example method or timing diagram for updating the configuration settings of an application via the configuration deployment system according to one embodiment.

FIG. 3 illustrates an example method or timing diagram for updating the configuration settings of an application via the configuration deployment system according to one embodiment. As shown in FIG. 3, initially, an administrator device 100 provides a modification to configuration settings, which are committed 300 to the configuration repository 114. The administrator device 100 may provide the changes via the user interface 200 as shown in FIG. 2, for example, and may be received by the deployment frontend 112 shown in FIG. 1, though other methods of committing these changes may also be used. These settings or changes are stored 310 by the configuration repository 114.

Next, the deployment module 116 identifies 320 the change in configuration settings from the configuration repository 114 and prepares to deploy the changes. To deploy the changes, the deployment module 116 identifies which namespaces have changed settings, and generates 330 a snapshot of configuration settings for each namespace. The deployment module 116 may notify a runtime configuration library 124 on the application having that namespace, or an application with that namespace may request a settings version from the deployment module 116 to identify 340 a version change of the configuration settings.

When the runtime configuration library identifies a version change, the runtime configuration library 124 requests and retrieves 350 the snapshot for its namespace from the deployment module 116. Prior to applying the configuration settings, the runtime configuration library 124 may call a function of the application 122 to verify 360 the configuration settings and confirm that the changed settings are compatible with the application 122. In one embodiment, the runtime configuration library 124 verifies one or more configuration settings by executing a function provided by the application 122 that enables the runtime configuration library 124 to evaluate the performance of the application 122 with the updated settings without having to load the settings. When the changes are successfully verified, the runtime configuration library 124 stores 370 the configuration settings and loads 380 the new configuration settings to objects associated with the updated fields at the application 122 and can update any related event handlers. Updating the event handlers allows the configuration settings to be loaded without disrupting the operation of the application.

Using the forgoing configuration deployment system 110, configuration changes can be easily input or changed by an administrator for deployment to a potentially wide number of applications using the configuration interface, and changes to the configuration settings can be easily identified and managed by the configuration repository. When there are errors or other performance problems with a change in configuration settings, the configuration repository permits the configuration change to be easily reverted and rolled back to a prior version of the configuration settings at the configuration deployment system 110. In addition, because the configuration settings are not automatically applied at the computing host 120 and are first verified with the application, erroneous configuration changes can be prevented from interrupting the operation of the application. On the other hand, valid configuration changes can be applied to the application without restarting the application.

Figure 4:
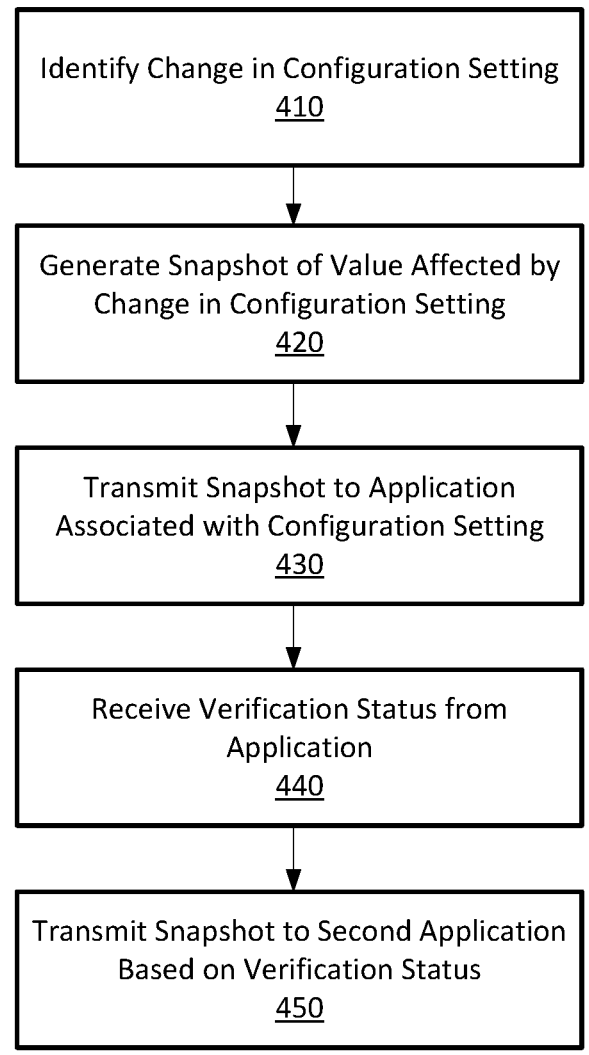
FIG. 4 is a flowchart illustrating a method for updating configuration settings for applications executing on a computing device in accordance with an embodiment of the present invention.

FIG. 4 is a flowchart illustrating a method for updating configuration settings for applications executing on a computing device in accordance with an embodiment of the present invention. The configuration deployment system 110 identifies 410 a change in a configuration setting within the configuration repository 114. As noted above, the change in a configuration setting may be provided by an administrator device 100 at the configuration deployment system 110. The configuration deployment system 110 generates 420 a snapshot of configuration values affected by the change in the configuration setting. The configuration deployment system 110 transmits 430 the snapshot to an application associated with the configuration setting. As noted above, the configuration setting may be a part of a namespace associated with the application. Subsequent to transmitting the snapshot to the application, the configuration deployment system 110 receives 440 a verification status from the application. The configuration deployment system 110 then transmits the snapshot to a different application based on the verification status.

Figure 5:
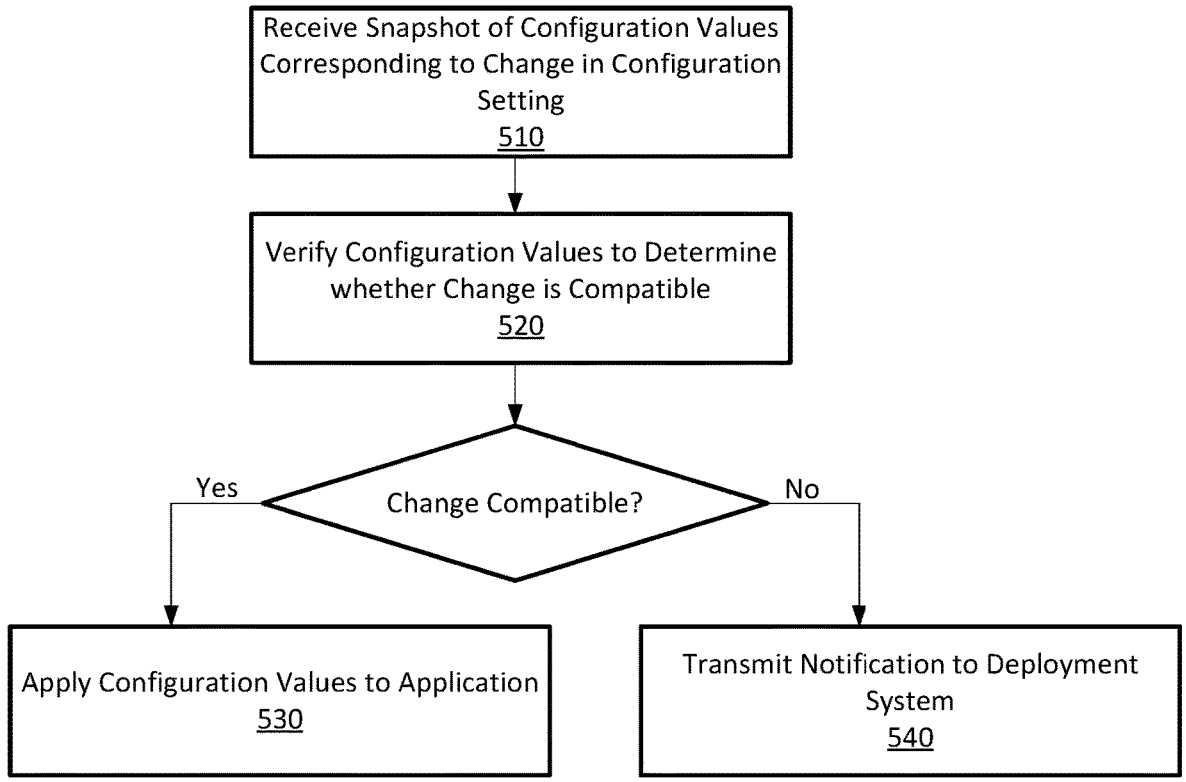
FIG. 5 is a flowchart illustrating a method for updating a configuration setting provided by a configuration deployment system in accordance with an embodiment of the present invention.

FIG. 5 is a flowchart illustrating a method for updating a configuration setting provided by a configuration deployment system in accordance with an embodiment of the present invention. An application 122 receives 510 from a configuration deployment system 110 a snapshot of configuration values corresponding to a change in a configuration setting. The application 122 verifies 520 the configuration values to determine whether the change in the configuration setting is compatible with the application 122. When the change is compatible, the application 122 applies the configuration values to the application 122. When the change is not compatible, the application 122 transmits a notification to the configuration deployment system 110 indicating that the change is not compatible with the application.

Figure 6:
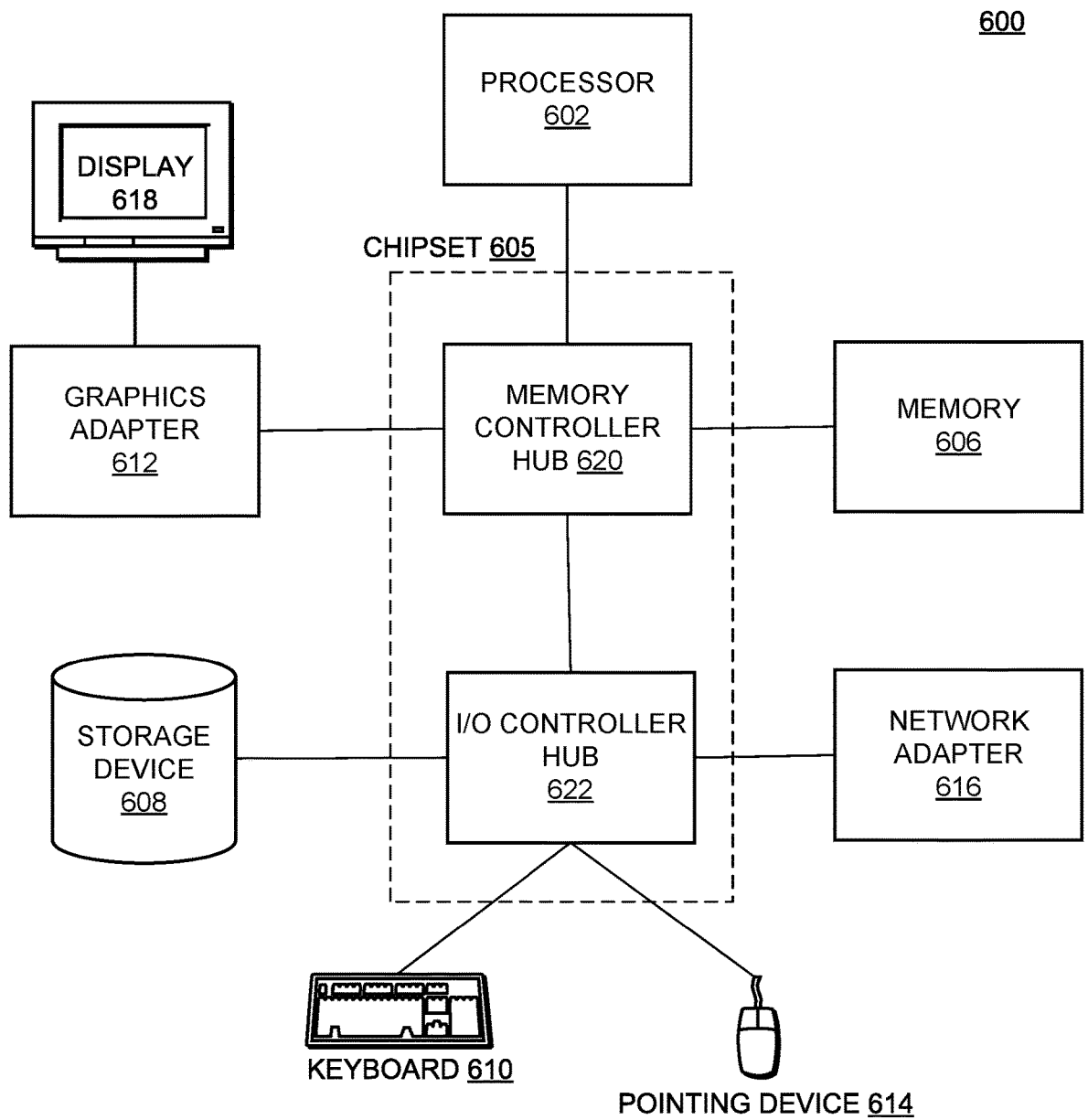
FIG. 6 is a high-level block diagram illustrating physical components of a computer 600 used as part or all of the configuration deployment system 110 or computing host 120A/B from FIG. 1, according to one embodiment.

FIG. 6 is a high-level block diagram illustrating physical components of a computer 600 used as part or all of the configuration deployment system 110 or computing host 120A/B from FIG. 1, according to one embodiment. Illustrated are at least one processor 602 coupled to a chipset 604. Also coupled to the chipset 604 are a memory 606, a storage device 608, a graphics adapter 612, and a network adapter 616. A display 618 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604.

The storage device 608 is any non-transitory computer-readable storage medium, such as a hard drive, compact disk read-only memory (CD-ROM), DVD, or a solid-state memory device. The memory 606 holds instructions and data used by the processor 602. The graphics adapter 612 displays images and other information on the display 618. The network adapter 616 couples the computer 600 to a local or wide area network.

As is known in the art, a computer 600 can have different and/or other components than those shown in FIG. 6. In addition, the computer 600 can lack certain illustrated components. In one embodiment, a computer 600, such as a host or smartphone, may lack a graphics adapter 612, and/or display 618, as well as a keyboard or external pointing device. Moreover, the storage device 608 can be local and/or remote from the computer 600 (such as embodied within a storage area network (SAN)).

As is known in the art, the computer 600 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 608, loaded into the memory 606, and executed by the processor 602.

The foregoing description of the embodiments has been presented for the purpose of illustration; it is not intended to be exhaustive or to limit the embodiments to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments described herein may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the examples described be limited not by this detailed description, but rather by any claims that issue on an application based hereon. Accordingly, the disclosure of the embodiments is intended to be illustrative, but not limiting, of the scope of the embodiments.

What is claimed is:

1. A method for updating configuration settings for applications executing on a computing device, the method comprising:
  identifying, at a configuration deployment system, a change in a configuration setting associated with an application installed on a computing device, the change received from an administrator device, wherein the configuration deployment system maintains configuration settings for applications executing on one or more computing devices;
  generating, by the configuration deployment system, a snapshot of configuration values that are affected by the change in the configuration setting;
  transmitting the snapshot to the application for verifying the changed configuration setting using a runtime configuration library, wherein the verification determines whether the configuration setting is compatible with the application, the runtime configuration library reporting application performance data to the configuration deployment system;
  receiving a verification status from the application, the verification status indicating whether the changed configuration is valid based on the application performance data; and in response to determining the verification status is valid, transmitting the snapshot to a second application associated with the configuration setting such that the snapshot is not transmitted to the second application when the verification status is not valid, wherein the second application has a previous configuration setting to be changed based on the snapshot.

2. The method of claim 1, wherein the configuration deployment system includes a configuration repository that stores configuration settings, the configuration settings organized into one or more namespaces that each correspond to a particular deployment of the configuration settings.

3. The method of claim 2, wherein each namespace inherits one or more other configuration settings from a base namespace that corresponds to a default configuration of the application.

4. The method of claim 1, wherein the configuration values are stored in a flat file included in a configuration repository.

5. The method of claim 1, further comprising generating a version identifier associated with the snapshot that is generated based on the change in configuration settings.

6. The method of claim 5, wherein transmitting the snapshot to the application comprises transmitting the snapshot responsive to a request received from the application that includes the version identifier.

7. The method of claim 1, wherein the verification status comprises a report of errors and performance data associated with the operation of the application subsequent to the configuration values in the snapshot being applied to the application.

8. The method of claim 1, wherein the application performance data includes event data, the event data occurring during the operation of the application subsequent to transmitting the configuration values in the snapshot, further comprising:
  comparing the event data with baseline event data associated with the application to determine whether the configuration setting impacted a performance of the application.

9. The method of claim 8, further comprising preventing transmission of the snapshot to a third application when the performance is below a baseline.

10. A computer program product for updating configuration settings for applications executing on a computing device, the computer program product stored on a non-transitory computer-readable storage medium and including executable instructions for causing one or more processors to carry out steps comprising:
  identifying, at a configuration deployment system, a change in a configuration setting associated with an application installed on a computing device, the change received from an administrator device, wherein the configuration deployment system maintains configuration settings for applications executing on one or more computing devices;
  generating, by the configuration deployment system, a snapshot of configuration values that are affected by the change in the configuration setting;
  transmitting the snapshot to the application for verifying the changed configuration setting using a runtime configuration library, wherein the verification determines whether the settings are compatible with the application, the runtime configuration library reporting application performance data to the configuration deployment system;
  receiving a verification status from the application, the verification status indicating whether the changed configuration is valid based on the application performance data; and
  in response to determining the verification is valid, transmitting the snapshot to a second application associated with the configuration setting such that the snapshot is not transmitted to the second application when the verification status is not valid, wherein the second application has previous configuration settings to be changed based on the snapshot.

11. The computer program product of claim 10, wherein the configuration deployment system includes a configuration repository that stores configuration settings, the configuration settings organized into one or more namespaces that each correspond to a particular deployment of the configuration settings.

12. The computer program product of claim 11, wherein each namespace inherits one or more other configuration settings from a base namespace that corresponds to a default configuration of the application.

13. The computer program product of claim 10, wherein the application performance data includes event data, the event data occurring during the operation of the application subsequent to transmitting the configuration values in the snapshot, further comprising:
  comparing the event data with baseline event data associated with the application to determine whether the configuration setting impacted a performance of the application.

14. The computer program product of claim 13, further comprising preventing transmission of the snapshot to a third application when the performance is below a baseline.

* * * * *